United States Patent [19]

Eian

[11] Patent Number: 5,541,273
[45] Date of Patent: Jul. 30, 1996

[54] METHOD FOR PREPARING POLY(VINYL TRIFLUOROACETATE) AND POLY(VINYL TRIFLUOROACETATE/VINYL ESTER) IN THE ABSENCE OF CHLOROFLUOROCARBON SOLVENT

[75] Inventor: Gilbert L. Eian, Mahtomedi, Minn.

[73] Assignee: Minnesota Mining and Manufacturing Co., Saint Paul, Minn.

[21] Appl. No.: 435,316

[22] Filed: May 5, 1995

Related U.S. Application Data

[62] Division of Ser. No. 285,784, Aug. 4, 1994, Pat. No. 5,414,048, which is a division of Ser. No. 152,393, Nov. 12, 1993, Pat. No. 5,336,740.

[51] Int. Cl.$^6$ .................................................. C08F 18/20
[52] U.S. Cl. ............................................ 526/245; 526/194
[58] Field of Search ........................................ 526/245, 194

[56] References Cited

U.S. PATENT DOCUMENTS

| | | | |
|---|---|---|---|
| 2,436,144 | 2/1948 | Howk et al. | 260/87 |
| 3,388,199 | 6/1968 | Chaney et al. | 264/182 |
| 4,673,539 | 6/1987 | Hammar et al. | 264/1.1 |
| 5,135,998 | 8/1992 | Mares et al. | 526/206 |

OTHER PUBLICATIONS

Gagnon et al., U.S. Ser. No. 07/775,969 filed Nov. 8, 1991.
Grosh et al., U.S. Ser. No. 07/605,754 filed Oct. 30, 1990.
Strobel et al., U.S. Ser. No. 07/605,757 filed Oct. 30, 1990.
Gagnon et al., U.S. Ser. No. 07/605,828 filed Oct. 30, 1990.
Gagnon et al., U.S. Ser. No. 07/605,834 filed Oct. 30, 1990.
Krinke et al., U.S. Ser. No. 07/605,921 filed Oct. 30, 1990.
Brizuela et al., U.S. Ser. No. 07/605,948 filed Oct. 30, 1990.
Haas et al., Journal of Polymer Science, vol. 22, p. 291 (1956).
Prichard et al., Journal of Polymer Science, Part A-1, vol. 4, p. 707 (1966).
Harris et al., Journal of Plymer Science, Part A-1, vol. 4, p. 665 (1966).
Polymer Handbook, Third Edition, J. Brandrup and E. H. Immergut, Eds., Wiley, NY, p. VII-519, (1989).
W. Nkoll, "Chemistry and Technology of Silicones", Academic Press (1968).
Textbook of Polymer Science, F. W. Billmeyer, Jr., Second Edition, Wily–Interscience, John Wiley and Sons, 1971, printed in the U.S.A. pp. 84–85.

*Primary Examiner*—Joseph L. Schofer
*Assistant Examiner*—N. Sarofim
*Attorney, Agent, or Firm*—Gary L. Griswold; Walter N. Kirn; Janice L. Dowdall

[57] ABSTRACT

A method for the production of poly(vinyl trifluoroacetate) and copolymers thereof with vinyl esters is described. Poly(vinyl trifluoroacetate) (PVTFA) is obtained in essentially quantitative yield under mild conditions by using non-chlorofluorocarbon solvents comprising siloxanes or perfluorinated fluid. Hexamethyl disiloxane is a particularly useful example of such solvents. Synthesis of syndiotactic PVTFA on a commercial scale without the use of environmentally-harmful solvents is made possible by the invention, which provides a convenient commercial route to syndiotactic polyvinyl alcohol.

20 Claims, No Drawings

METHOD FOR PREPARING POLY(VINYL TRIFLUOROACETATE) AND POLY(VINYL TRIFLUOROACETATE/VINYL ESTER) IN THE ABSENCE OF CHLOROFLUOROCARBON SOLVENT

This is a division of U.S. application No. 08/285,784 filed Aug. 4, 1994, now U.S. Pat. No. 5,414,048 which is a division of U.S. application No. 08/152,393 filed Nov. 12, 1993 U.S. Pat. No. 5,336,740.

FIELD OF THE INVENTION

This invention relates to a method of polymerizing vinyl trifluoroacetate ($CF_3COOCH=CH_2$) and vinyl trifluoroacetate/vinyl ester mixtures in the absence of chlorofluorocarbon (CFC) solvents.

BACKGROUND OF THE INVENTION

Poly(vinyl trifluoroacetate) has commercial importance as a precursor to highly syndiotactic poly(vinyl alcohol) hydrogels, which themselves are commercially important as materials for, e.g., contact lenses, membranes, and as coatings for polymeric and non-polymeric substrates such as membranes. Heretofore, the polymerization of vinyl trifluoroacetate has posed a number of significant problems.

Bulk synthesis of poly(vinyl trifluoracetate) via free-radical polymerization has been described in U.S. Pat. No. 2,436,144 (assigned to duPont), but the method is not practical on a large scale due to the highly exothermic nature of the polymerization. Polymerization of vinyl trifluoracetate in common organic solvents has been described. Haas et al., *Journal of Polymer Science*, Vol. 22, p. 291 (1956), describe a reaction in acetone, resulting in a low-molecular weight material. Pritchard et al., *Journal of Polymer Science*, Part A-1, Vol. 4, p. 707 (1966) describe synthesis in n-heptane at 80° C. with low conversion, and in carbon tetrachloride at −50° C., also with low conversion. Harris et al., *Journal of Polymer Science*, Part A-1, Vol. 4, p. 665 (1966) describe a reaction in n-heptane at −78° C. to give a high molecular weight polymer. Such low temperature reaction conditions are difficult to maintain on a commercial scale.

Polymerization of vinyl trifluoroacetate in inert chlorofluorocarbon solvents such as that available under the trademark FREON™ 113 has been described by Gagnon, et al. in pending U.S. Pat. application Ser. No. 07/775,969, filed Nov. 8, 1991, now abandoned assigned to the assignee of the present invention, which is a continuation-in-part of the following U.S. patent applications Ser. Nos.: 07/605,754, 07/605,757, 07/6051828, 07/605,834, 07/605,921 and 07/605,948, all filed Oct. 30, 1990 all abandoned. A similar synthesis was described by Hammar et al. in U.S. Pat. No. 4,673,539, assigned to the assignee of the present invention, with the exception that Hammar et al. did not use trifluoroacetic anhydride as a water scavenger. Commercial use of such chlorofluorocarbon solvents is severely restricted for environmental reasons.

Copolymers of vinyl trifluoroacetate and acrylonitrile, produced in cyclohexane or hexane solutions, are described in U.S. Pat. No. 3,388,199 (Monsanto). However, incorporation of vinyl trifluoroacetate is unsatisfactory.

BRIEF DESCRIPTION OF THE INVENTION

Thus, there is a need for a method of polymerizing vinyl trifluoroacetate (VTFA) or copolymerizing vinyl trifluoroacetate with vinyl ester monomer(s) in a commercially and environmentally acceptable manner to produce a polymer in high yield exhibiting a high inherent viscosity, i.e., a high molecular weight. We have discovered such a method. The invention relates to a method for the (co)polymerization of vinyl trifluoroacetate monomer, comprising the steps of:

(a) preparing a mixture comprising:
   (i) vinyl trifluoroacetate monomer;
   (ii) optionally, vinyl ester monomer(s);
   (iii) a solvent selected from the group consisting of siloxane oligomers, organosiloxanes, polyorganosiloxanes, perfluorinated fluids, and mixtures thereof;
   (iv) a free-radical polymerization initiator;
   (v) optionally, a water scavenger; and
(b) activating the mixture to effect polymerization of the monomer and form a (co)polymer.

Poly(vinyl trifluoracetate) (PVTFA) is obtained in high yield under mild conditions by using non-chlorofluorocarbon (non-CFC) solvents such as siloxanes and/or perfluorinated fluids. Preferably the reaction mixture consists essentially of the components of elements (i), (iii), and (iv), and optionally (ii) and (v). Most preferably the reaction mixture consists of the components of elements (i), (iii), and (iv), and optionally (ii) and (v). The polymers prepared according to the method of the invention typically exhibit inherit viscosities greater than about 0.3 dl/g. Synthesis of syndiotactic PVTFA on a commercial scale without the use of environmentally-harmful solvents is made possible by the invention, which provides a convenient commercial route to syndiotactic poly(vinyl alcohol). Copolymerization of vinyl trifluoroacetate monomer with vinyl ester monomers is possible according to the method of the invention by including vinyl ester monomer in the mixture of element (a).

Various useful concentrations and parameters of the reaction are described in detail below.

DETAILED DESCRIPTION OF THE INVENTION

I. Solvents

Solvents dictate two critical parameters for the present invention. First, for environmental reasons, the solvent cannot comprise chlorofluorocarbons, which have been found to be detrimental to atmospheric ozone. Second, the solvent must be effective in allowing or promoting adequate chain extension to achieve a desired molecular weight or inherent viscosity.

A convenient measure of relative solvating effectiveness is called the "solubility parameter," represented by the symbol δ. The solubility parameter is directly related to the energy of vaporization of the solvent, and describes the attractive strength between the molecules of the solvent. Materials with comparable solubility parameter values are generally mutually soluble. See. *Polymer Handbook*, Third Edition, J. Brandrup and E. H. Immergut, Eds., Wiley, New York, 1989, p. VII–519. Solvents useful in the present invention may be selected from the group consisting of those exhibiting a solubility parameter of about 6.5 $(cal/cm^3)^{1/2}$ or less.

The solvents typically useful according to the invention vary considerably in viscosity, from less than about 1 (i.e., about 0.4) to about 20,000 centistokes (cs). Preferably, solvents useful in the invention have viscosities of about 0.4 to about 1000 (cs), most preferably, about 0.4 to about 100 (cs). If the solvent is too viscous agitation of the reaction mixture becomes too difficult.

The solvent should have a melting point below about 30° C. and be liquid at the use temperature. The silicone fluids and the perfluoro-materials are advantageous over previously-used solvents in that they do not contribute to atmospheric pollution and may be handled safely in large quantities.

I.A. Siloxane Solvents

Silicone fluids comprising oligomers and polymers having a general formula selected from the group consisting of $[(R)_2SiO]_n$ and $(R)_3SiO$—$[(R)_2SiO]_q$—$Si(R)_3$, where R is independently selected from the group consisting of alkyl groups, aryl groups and —$[(R^1)_2SiO]_p$—$R^1$ wherein $R^1$ is alkyl or aryl, n is independently an integer of about 2 to about 10, p is an integer of 0 or greater, and q is independently an integer of 0 or greater (preferably about 0 to about 1000) are common commercial materials. Preferably, R and $R^1$ are each independently selected from the group consisting of about $C_1$ to about $C_{10}$ saturated linear hydrocarbon radicals, about $C_1$ to about $C_{10}$ saturated branched hydrocarbon radicals, about $C_6$ to about $C_{12}$ alkyl substituted aromatic hydrocarbon radicals, about $C_3$ to about $C_{10}$ saturated cycloaliphatic hydrocarbon radicals, and combinations thereof. Most preferably, R and $R^1$ are each independently selected from the group consisting of methyl, ethyl, n-propel, and isopropyl. These materials have been described in detail in, e.g., "Chemistry and Technology of Silicones" by W. Knoll, Academic Press, 1968. Siloxanes comprise several structural classes all of which are useful herein: linear, branched, and cyclic. Mixtures of the aforementioned are also useful herein. Many of the linear, branched, and cyclic polysiloxanes have melting points below about 30° C. and may be used in the liquid state as reaction solvents. Such materials are also commonly referred to as silicone liquids, silicone fluids, or silicone oils.

The term "siloxane solvents" as used herein includes organosiloxanes, organosiloxane oligomers, and polyorganosiloxanes. The general term "polyorganosiloxanes," is often shortened to "polysiloxanes," and both terms are adopted and used interchangeably herein. The terms "solvents" and "fluids" are used interchangeably herein. Useful siloxane solvents according to the invention are not limited to those with silicon atoms bearing methyl groups exclusively. Any siloxane solvents having saturated hydrocarbon groups as substituents on the silicon atoms would be useful, providing their viscosities fall within the range described infra. Such saturated hydrocarbon groups may be linear, branched, or cyclic. Siloxane solvents bearing functionalized organic groups which would interfere with the free-radical polymerization of the monomers according to the invention, such as hydrogen, halogen, or alkoxy, would not be useful.

I.A.i. Linear Siloxane Solvents

Examples of useful linear siloxane solvents according to the invention include but are not limited to those of the formula (I)

$$(R)_3Si-O-[(R)_2Si-O-]_qSi(R)_3 \qquad (I)$$

wherein q represents an integer of 0 or greater, and R is independently selected from the group consisting of alkyl groups and aryl groups. Preferably, R is independently selected from the group consisting of about $C_1$ to about $C_{10}$ saturated linear hydrocarbon radicals, about $C_1$ to about $C_{10}$ saturated branched hydrocarbon radicals, about $C_6$ to about $C_2$ alkyl substituted aromatic hydrocarbon radicals, about $C_3$ to about $C_{10}$ saturated cycloaliphatic hydrocarbon radicals, and combinations thereof. Most preferably, R is independently selected from the group consisting of methyl and phenyl.

Examples of specific linear siloxane solvents useful according to the method of the invention are the siloxane oligomers of the formula (Ia), commercially available from Dow Corning as "Dow Corning® 200 Fluids":

$$(CH_3)_3Si-O-[(CH_3)_2Si-O-]_qSi-(CH_3)_3 \qquad (Ia)$$

wherein q represents an integer of 0 or greater. The fluids are manufactured to yield essentially linear oligomers and/or polymers with average kinematic viscosities typically ranging from less than one centistoke(s) (cs) (i.e., about 0.4 cs) to about 20,000 cs which are primarily linear but which can include cyclic and/or branched structures. A preferred linear solvent is the dimethylsiloxane of Formula Ia wherein q is an integer of about 0 to about 1000. The solvents exhibit a range of q-values and are preferably characterized by their viscosity rather than their molecular size. A particularly preferred solvent is hexamethyl disilxane (q=0), available from Dow Corning Company as Dow Corning® 200 Fluid, 0.65 (cs).

I.A.ii. Cyclic Siloxane Solvents

Examples of useful cyclic siloxanes according to the invention include but are not limited to those of the general formula

(II)

wherein n represents an integer of about 3 to about 9, preferably about 4 to about 7; and R is independently selected from the group consisting of alkyl groups and aryl groups. Preferably, R is independently selected from the group consisting of about $C_1$ to about $C_{10}$ saturated linear hydrocarbon, radicals, about $C_1$ to about $C_{10}$ saturated branched hydrocarbon radicals, about $C_6$ to about $C_{12}$ alkyl substituted aromatic hydrocarbon radicals, about $C_3$ to about $C_{10}$ saturated cycloaliphatic hydrocarbon radicals, and combinations thereof. Most preferably, R is independently selected from the group consisting of methyl and phenyl.

Examples of specific cyclic siloxanes useful for the subject polymerization include the cyclic polydimethylcyclosiloxanes of formula (IIa)

(IIa)

wherein n represents an integer of about 3 to about 9, preferably about 4 to about 7. The most preferred cyclic siloxanes, those in which n is 4 to 5, are also known as octamethylcyclotetrasiloxane (commonly referred to as "$D_4$"), and decamethylcyclopentasiloxane ("$D_5$"), respectively. These materials are also made available by Dow Corning Company as Dow Corning® 244, 245, 344, and 345 Fluids, depending on their relative proportions of $D_4$ and $D_5$. Mixtures of the straight-chain and cyclic dimethyl siloxanes are also useful according to the present invention.

I.A.iii. Branched Siloxane Solvents

Useful branched siloxane solvents according to the method of the invention include but are not limited to those of the general structures (III) and (IV),

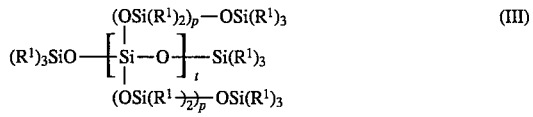
(III)

-continued

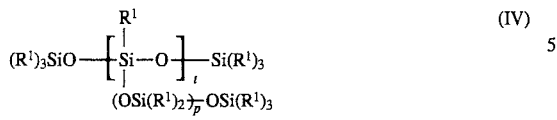

wherein each $R^1$ is independently selected from the group consisting of alkyl and aryl groups; t represents an integer of from about 1 to about 5, and p independently represents an integer of 0 or greater, providing the branched polyorganosiloxane exhibits a viscosity within the ranges as cited above and has a melting point below about 30° C. and may be used in the liquid state as a reaction solvent. Preferably, $R^1$ is independently selected from the group consisting of about $C_1$ to about $C_{10}$ saturated linear hydrocarbon, radicals, about $C_1$ to about $C_{10}$ saturated branched hydrocarbon radicals, about $C_6$ to about C12 alkyl substituted aromatic hydrocarbon radicals, about $C_3$ to about $C_{10}$ saturated cycloaliphatic hydrocarbon radicals, and combinations thereof. Most preferably, $R^1$ is independently selected from the group consisting of methyl and phenyl.

Examples of specific useful branched polymers are those of the general formulas (IIIa) and (IVa)

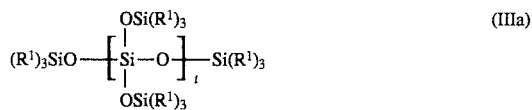

and

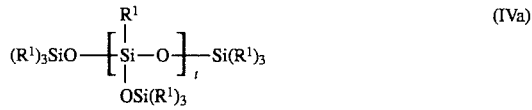

wherein $R^1$ and t are as previously defined, for formulas III and IV.

I.B. Perfluorinated Solvents

The terms "perfluorinated solvents", "perfluorinated fluids", and "perfluoro-materials" are used interchangeably herein. Another class of solvents satisfying the above requirements are the perfluorinated solvents. The term "perfluorinated solvents" includes but is not limited to perfluorinated organic compounds selected from the group consisting of linear aliphatic, branched aliphatic, cycloaliphatic, aromatic, aralkyl, and heterocyclic compounds in which all hydrogen atoms have been replaced by fluorine atoms and which exhibit boiling points above about 45° C., and mixtures thereof. Examples of perfluorinated solvents include but are not limited to those selected from the group consisting of perfluorinated hydrocarbons, perfluorinated amines, perfluorinated ethers, and mixtures thereof. Representative examples of these solvents include but are not limited to those selected from the group consisting of perfluoro-N-methyl morpholine, perfluorohexane, and mixtures thereof.

Perfluorinated solvents which are liquids under typical reaction conditions (in the temperature range of from about 150° C. to about 50° C. at pressures of from about 1 to about 5 atmospheres) are typically used in order to avoid the use of a pressurized reaction vessel.

II. Vinyl Trifluoroacetate Monomer

Vinyl trifluoroacetate monomer can be obtained by a modification of the procedure described in U.S. Pat. No. 2,436,144. Trifluoroacetic acid and acetylene are allowed to react in the presence of red mercuric oxide and trifluoroacetic anhydride, after which the desired vinyl trifluoroacetate is separated from unreacted starting materials, then distilled. Vinyl trifluoroacetate monomer is also available commercially.

III. Optional Vinyl Ester Comonomers

Copolymers of vinyl trifluoroacetate and vinyl esters (typically formed from about $C_1$ to about $C_{20}$ carboxylic acids) are also prepared by the method of the invention. Preferred vinyl esters are those of the general formula $CH_3-X_m-COO-CH=CH_2$, wherein X represents a linear or branched hydrocarbon segment comprising from about 1 to about 18 carbon atoms and m is an integer selected from the group consisting of 0 to 1. Examples of such vinyl esters include but are not limited to those selected from the group consisting of vinyl acetate, vinyl propionate, vinyl butyrate, vinyl pivalate, vinyl 2-ethylhexanoate, vinyl neononate, vinyl neodecanoate, vinyl stearate, and mixtures thereof.

The concentration range of monomeric vinyl trifluoroacetate plus optional vinyl ester comonomer in the reaction mixture (the vinyl trifluoroacetate, solvent, initiator, optional water scavenger, plus optional vinyl esters) for the polymerization reactions of this invention is typically from about 5 to about 50 weight percent, based on the total weight of the reaction mixture. Preferably, a total monomer concentration range of from about 10 to about 35 weight percent is used, most preferably about 15 to about 25 weight percent based upon the total weight of the reaction mixture in order to obtain a preferred polymer. If too dilute a concentration is used, the resulting polymer will have an undesirably low molecular weight and the polymer precipitates as it is formed. If the reaction mixture is too concentrated, adequate agitation is not possible. The reaction mixture typically comprises about 50 to about 95 weight percent solvent based upon the total weight of the mixture, preferably about 65 to about 90 weight percent, most preferably about 75 to about 85 weight percent.

The polymers of the invention can be formed from a monomer charge comprising about 1 to about 100 percent by weight vinyl trifluoroacetate monomer and about 0 to about 99 percent by weight vinyl ester monomer based upon the total weight of monomer. Copolymers of vinyl trifluoroacetate and vinyl esters can be prepared in relative concentrations of from about 0.1 to about 99 weight percent vinyl ester, and about 1 to about 99.9 weight percent vinyl trifluoroacetate based on total monomer weight. Typically, vinyl trifluoroacetate-vinyl ester copolymers comprise from about 0.1 to about 20 weight percent vinyl ester and about 80 to about 99.9 weight percent vinyl trifluoroacetate, preferably from about 0.2 to about 10 weight percent vinyl ester and about 90 to about 99.8 weight percent vinyl trifluoroacetate, and most preferably from about 0.25 to about 5 weight percent vinyl ester and about 95 to about 99.75 weight percent vinyl trifluoroacetate, based on the total weight of monomers in the copolymer.

Copolymers of vinyl trifluoroacetate and other vinyl esters are useful in a number of applications. The incorporation of small amounts of vinyl acetate renders a copolymer having modified physical characteristics, such as water solubility and water swellability. When vinyl esters are copolymerized with vinyl trifluoroacetate, selective hydrolysis of the trifluoroacetate moieties is possible, generating poly(vinyl alcohol)-poly(vinyl ester) copolymers.

IV. Free-Radical Initiator

Free-radical polymerization initiators known in the art are useful in the invention, including but not limited to those selected from the group consisting of peroxides, azo compounds, nonaqueous redox initiators, and mixtures thereof.

Useful peroxide initiators include but are not limited those selected from the group consisting of benzoyl peroxide, lauroyl peroxide, dicetyl peroxydicarbonate, t-amyl peroxyneodecanoate, di(4-t-butylcyclohexyl)peroxydicarbonate (PERKADOX™ 16, from AKZO Chemicals), and mixtures thereof.

Useful azo initiators include but are not limited to those selected from the group consisting of 2,2'-azobis(2-methylbutyronitrile), 2,2'-azobis(isobutyronitrile), 2,2'-azobis(2,4-dimethylpentanenitrile), and mixtures thereof. Commercial products of this type include VAZO™ 67, VAZO™ 64, and VAZO™ 52, respectively, available from duPont.

Useful nonaqueous oxidation-reduction ("redox") initiators include but are not limited to those selected from the group consisting of tertiary amines with organic peroxides (exemplified by the N,N-dimethylaniline-benzoyl peroxide pair), organic halides with transition metal complexes (exemplified by the carbon tetrachloride-molybdenum hexacarbonyl pair), and rhenium or manganese carbonyls with unsaturated organic coinitiators (exemplified by the dirhenium decacarbonyl-tetrafluoroethylene pair), and mixtures thereof.

Useful nonaqueous photoinitiators include but are not limited to those selected from the group consisting of benzoin ethers, aryl alkyl ketones, benzils, benzil ketals, oximinoketones, and mixtures thereof.

Preferably, di(4-t-butylcyclohexyl)peroxydicarbonate is selected as the initiator due to its lower decomposition temperature and its ease of handling. If azo initiators are used, higher reaction temperatures are required, which may require the use of a reaction vessel capable of withstanding higher internal pressures. Preferably, the initiator decomposes at a temperature of between about 30° C. and about 90° C., and most preferably at a temperature of between about 40° C. and about 50° C. in order to obtain (co)polymer of usefully high inherent viscosity. The amount of initiator used typically ranges from about 0.1 to about 5 weight percent, preferably about 0.2 to about 2 weight percent, and most preferably from about 0.3 to about 1 weight percent, based on the weight of the vinyl trifluoroacetate monomer plus optional vinyl ester monomer used. The use of a minimum amount of initiator relative to amount of monomer produces desirably higher molecular weight in the resultant (co)polymer.

V. Water Scavenger

Traces of water in the reaction mixture adversely affect both conversion of monomer to (co)polymer and the molecular weight of the (co)polymer, when siloxane solvents are used. Thus, inclusion of a water scavenger in the reaction mixture has been found to be advantageous. However, a water scavenger is not needed when perfluorinated solvents are used. Preferably, when a water scavenger is employed, acetic anhydride is selected since it is inexpensive, readily available and easily separated from the desired product. Other useful water scavengers include anhydrides known in the art, including but not limited to those selected from the group consisting of trifluoroacetic anhydride, phthalic anhydride, succinic anhydride, and mixtures thereof. Useful amounts of water scavenger typically range from about 0 to about 10 weight percent, preferably about 0.5 to about 5 weight percent, more preferably about 1 to about 4 weight percent, and most preferably from about 2 to about 3 weight percent, based on the total weight of the reaction mixture (vinyltrifluoroacetate monomer, optional vinyl ester monomer, solvent, initiator, and optional water scavenger).

VI. Method of (Co)Polymerization

The (co)polymerization method of the invention is typically as follows. A mixture is prepared of the monomers, solvent, initiator, and optional water scavenger. The components may be charged to a suitable reaction vessel in any order. The mixture is activated to effect (co)polymerization. This is typically done by the application of heat, along with agitation, under inert conditions such as a nitrogen atmosphere. (Co)polymerization typically occurs over 4 to 24 hours, typically at 35° C. to 90° C. depending upon the components selected and their concentrations. The (co)polymerization typically continues until about 50 to 100% conversion occurs. The resultant (co)polymer can be separated or collected from the solvent by filtration.

Test Method

Inherent Viscosity (IV) Measurement

The inherent viscosity of a polymer solution is well-known in the art as a useful measure of polymer molecular weight, and is defined as the ratio of the log of the relative viscosity to the polymer concentration. See "Textbook of Polymer Science." Second Edition by F. W. Billmeyer, Jr., Wiley (New York), 1971, p. 84 incorporated by reference herein. Inherent viscosities were measured in methyl ethyl ketone solvent using a Cannon-Fenske tube at 27° C. and at a nominal concentration of 0.2 g/dl and are reported in units of dl/g.

EXAMPLES

The following Examples further illustrate but do not limit the invention. All parts, percentage, ratios, etc. in the Examples and the rest of the specification are by weight unless indicated otherwise.

Preparation of Vinyl Trifluoroacetate Monomer

Two identical batches of vinyl trifluoroacetate monomer were prepared, as follows:

A mixture of 912 g trifluoroacetic acid and 102 g red mercuric oxide was stirred at 30° C. for 30 minutes, then treated with 46 g trifluoroacetic anhydride. Under continuous stirring at a reaction temperature of between 35° C. and 40° C., acetylene was bubbled into the above mixture at a such a rate that excess acetylene did not escape the reaction mixture. When the reaction solution was observed to be saturated, acetylene addition was discontinued. The temperature of the reaction vessel was raised to 50° C., and vinyl trifluoroacetate was collected by distillation. Gas chromatographic analysis of the crude vinyl trifluoroacetate indicated the presence of about 4.5 percent trifluoroacetic anhydride, which was carefully hydrolyzed by stirring with 9 g water.

The two identical crude reaction products were combined and distilled to give a total of 1143 g vinyl trifluoroacetate of greater than 99.8% purity.

Example 1

Poly(vinyl trifluoracetate) Prepared in HMDS

A mixture of 44 g hexamethyl disiloxane (Dow Corning® 200 Fluid, 0.65 cs, from Dow Corning), 1 g acetic anhydride, 5.4 g vinyl trifluoroacetate monomer (the preparation of which is described above), and 0.0468 g di(4-t-butylcyclohexyl)peroxydicarbonate (PERKADOX™ 16 from AKZO Chemicals) was weighed into a 100 ml glass bottle which was then purged with dried argon and sealed with a metal cap containing an inert liner. The bottle was agitated in a water bath at about 45° C. for about 22 hours. The polymer was collected and dried in a vacuum oven at about 40° C. for about 18 hours to determine percent conversion, and the inherent viscosity of the polymer was measured.

Percent conversion and inherent viscosity are set forth in Table 1.

Examples 2A–2D and Comparative Examples 2E–2Q: poly(vinyl trifluoroacetate)s Prepared in Various Solvents To compare percent conversions and IVs of poly(vinyltrifluoroacetate) prepared in various solvents, the general method of Example 1 was repeated, using other candidate solvents in place of hexamethyldisiloxane. Reactions were carried out at 45° C., with a monomer concentration of 10%, based on the total weight of the reaction mixture, using an initiator concentration of 0.9% by weight based on monomer weight, with a concentration of acetic anhydride equal to 2% by volume of the total reaction mixture. In Table I, reactions marked with (*) were carried out at 40° C., with a monomer concentration of 31%, based on the total weight of the reaction mixture, using 0.37% by weight initiator, based on monomer weight, and were carried out in the absence of acetic anhydride. The reaction marked with (**) was carried out at 40° C., with 25% monomer solids, based on the total weight of the reaction mixture, using 0.5% by weight of initiator and 2% by volume, based on the total volume of the reaction mixture, of acetic anhydride. The initiator for all reactions was Perkadox™ 16 (di(4-t-butylcyclohexyl)peroxydicarbonate.) The percentage conversions and IVs for Examples 2A–2D and Comp. Ex. 2E–2Q are shown in Table I. "CFC" refers to a chlorofluorocarbon solvent. "Non-CFC" refers to a solvent which is not a chlorofluorocarbon.

TABLE I

POLYMERIZATION OF VINYL TRIFLUOROACETATE IN VARIOUS SOLVENTS

| Ex. | Solvent | Percentage Conversion | IV, dl/g |
|---|---|---|---|
| 2A | Hexamethyl disiloxane (HMDS) (non-CFC) | 100 | 0.30 |
| 2B | Octamethyltetrasiloxane** (non-CFC) | **** | 0.70 |
| 2C | Perfluorohexane (non-CFC) | 79 | 0.37 |
| 2D | Perfluoro-N-methyl morpholine (non-CFC) | 69 | 0.45 |
| Comp. 2E | FREON ™ 113 1,1,2-trifluoro-1,1,2-trichloroethane (CFC) | 92 | 0.62 |
| Comp. 2F | Chloropentafluorobenzene* (CFC) | 75 | 0.36 |
| Comp. 2G | Hexanes (non-CFC) | 82 | 0.09 |
| Comp. 2H | Benzene* (non-CFC) | 4 | 0.09 |
| Comp. 2I | Cyclohexane (non-CFC) | 92 | 0.06 |
| Comp. 2J | Carbon Tetrachloride* (non-CFC) | 88 | 0.04 |
| Comp. 2K | Toluene (non-CFC) | 4 | *** |
| Comp. 2L | Ethyl Acetate (non-CFC) | 100 | 0.10 |
| Comp. 2M | Tetrahydrofuran (non-CFC) | 12 | *** |
| Comp. 2N | Chloroform* (non-CFC) | 86 | 0.09 |
| Comp. 2O | Acetone (non-CFC) | 97 | 0.07 |
| Comp. 2P | Acetonitrile (non-CFC) | 49 | *** |
| Comp. 2Q | Nitromethane* (non-CFC) | 0 | *** |

***IV not measured due to low conversion. These solutions had very low bulk viscosity, indicating formation of little or no high molecular weight polymer.
****Percentage conversion not measured due to the high boiling point of the solvent.

The results presented in Table I indicate that the perfluorinated solvents perfluorohexane and perfluoro-N-methyl morpholine and the polyorganosiloxane solvent HMDS, used according to the method of the present invention, present a practical combination of conversion and IV, among the environmentally-acceptable solvents tested. The non-fluorocarbon solvents hexanes, benzene, cyclohexane, carbon tetrachloride, toluene, ethyl acetate, tetrahydrofuran, chloroform, acetone, acetonitrile, and nitromethane, had insufficiently low IVs. The chlorofluorocarbon solvents 1,1,2-trifluoro-1,1,2-trichloroethane and chloropentafluorobenzene had good conversion and IVs but, as mentioned, are environmentally unacceptable.

Examples 3A–3F

Vinyl Trifluoroacetate/Vinyl Ester Copolymers

A series of copolymers (Examples 3A–3F) comprising the polymerization product of vinyl trifluoroacetate and vinyl ester comonomers were prepared as follows: A premix comprising 272 g HMDS, 12.2 g acetic anhydride, and 1.1 g PERKADOX™ 16 (di(4-t-butylcyclohexyl)peroxydicarbonate (available from AKZO Chemicals) was prepared, and 45.5 g of the premix was added to a 250 ml narrow-mouth bottle. Vinyl monomers were added (see Table II for monomer types and amounts) and the bottles were sealed and agitated at 65° C. for 19.5 hours. Each product was isolated by filtration and each resulting solid copolymer was dried in an oven at 40° C. for 12 hours. Table II shows inherent viscosity and yield of the dried solid copolymer.

TABLE II

VINYL TRIFLUOROACETATE - VINYL ESTER COPOLYMERS

| Example | 3A | 3B | 3C | 3D | 3E | 3F |
|---|---|---|---|---|---|---|
| VTFA, g | 18.5 | 17.5 | 18.5 | 17.5 | 18.5 | 17.5 |
| Vinyl acetate, g | 1.0 | 1.9 | | | | |
| Vynate Neo 9($^1$), g | | | 1.0 | 1.9 | | |
| Vinyl Stearate ($^2$), g | | | | | 1.0 | 1.9 |
| Yield, % | 77 | 90 | 89 | 90 | 88 | 88 |
| IV, dl/g | 0.41 | 0.49 | 0.44 | 0.42 | 0.48 | 0.43 |

($^1$)Vynate Neo 9 is the vinyl ester of a branched C-9 carboxylic acid, available from Union Carbide.
($^2$)Vinyl stearate was obtained from Monomer-Polymer and Dajac Laboratories, Inc..

The data contained in Table II demonstrates that copolymers can be prepared by the process of this invention with yield and IV values similar to those obtained for poly(vinyl trifluoracetate) homopolymer.

Example 4

Hydrolysis of Trifluoroacetate Groups of Vinyl Trifluoroacetate/Vinyl Ester Copolymers The copolymers shown in Table II (Examples 3A–3F) were hydrolysed to remove trifluoroacetate groups and generate the corresponding vinyl alcohol/vinyl ester copolymers, as follows: A sample of from about 15 to about 18 g of each solid copolymer powder was separately slurried in 150 ml of methanol in a 500 ml wide-mouth jar, to which was added 20 ml concentrated ammonium hydroxide solution (15 moles of ammonia dissolved in water to make 1 liter of solution). An initial decrease in solution viscosity was followed by an increase as hydrolysis proceeded. The jar was capped and placed on a platform shaker for 12 hours. The contents were collected by filtration, washed three times with methanol, then dried in a vacuum oven at 40° C. for 12 hours. Yield of dried copolymeric product was about 6 grams. Differential Scanning Calorimetry (DSC) analysis of the copolymeric products prepared from the copolymers of Examples 3E and 3F of Table II showed sharp peaks at 36° C. and 41° C., respectively, which is indicative of the presence of a crystalline vinyl stearate phase, since vinyl stearate homopolymer has a melting point of about 40° C.

Example 5

Poly(vinyl trifluoroacetate) Prepared in Cyclic Siloxane Solvent

The general polymerization method described in Example 1 was repeated, except that octamethylcyclotetrasiloxane ($D_4$) was used as the solvent. Vinyl trifluoroacetate monomer concentration was 25% of the total solution weight PERKADOX™ 16 (di(4-t-butylcyclohexyl)peroxydicarbonate) initiator was used at 0.5% of the monomer weight, acetic anhydride was added at 2% of the total reaction mixture weight. The polymerization was run at 40° C. for 24 hours. The resultant inherent viscosity of the polymer was 0.70 dl/g.

Examples 6A–6C

Effect of Acetic Anhydride on Inherent Viscosity of PVTF

Examples 6A to 6C were prepared according to the procedure of Ex. 1 except that the amount of VTFA monomer and initiator were varied as indicated in Tables 6A–C, respectively. In addition, the amounts of acetic anhydride added to the reactive mixtures of 6A, 6B, and 6C, were varied. All reactions were carried out at 45° C. in hexamethyl disiloxane using Perkadox™ 16 initiator, as described in Example 1. Percentage concentrations of monomers indicate weight percent based on total weight of the reaction mixture. Initiator concentrations were based on the total weight of monomer. Table 6A–C show the dependence of the polymer inherent viscosity on anhydride concentration and that for each monomer concentration tested there is a specific anhydride concentration that optimized the molecular weight of the polymer.

TABLE 6A

| ACETIC ANHYDRIDE % OF TOTAL REACTION MIXTURE | % INITIATOR | % MONOMER | IV dl/g | % CONVERSION |
| --- | --- | --- | --- | --- |
| 0 | 1.6 | 10 | 0.202 | 87 |
| 0.2 | 1.6 | 10 | 0.221 | 90 |
| 0.4 | 1.6 | 10 | 0.136 | 96 |
| 0.8 | 1.6 | 10 | 0.236 | 92 |
| 4.4 | 1.6 | 10 | 0.236 | 93 |
| 9 | 1.6 | 10 | 0.179 | 92 |

TABLE 6B

| ACETIC ANHYDRIDE % OF TOTAL SOLUTION | % INITIATOR | % MONOMER | IV dl/g | % CONVERSION |
| --- | --- | --- | --- | --- |
| 0 | 0.9 | 20 | 0.337 | 84 |
| 0.2 | 0.9 | 20 | 0.351 | 87 |
| 0.4 | 0.9 | 20 | 0.368 | 87 |
| 0.8 | 0.9 | 20 | 0.401 | 89 |
| 2 | 0.9 | 20 | 0.463 | 90 |
| 6 | 0.9 | 20 | 0.381 | 87 |

TABLE 6C

| ACETIC ANHYDRIDE % OF TOTAL SOLUTION | % INITIATOR | % MONOMER | IV dl/g | % CONVERSION |
| --- | --- | --- | --- | --- |
| 0 | 0.9 | 30 | 0.45 | 91 |
| 0.4 | 0.9 | 30 | 0.48 | 92 |

TABLE 6C-continued

| ACETIC ANHYDRIDE % OF TOTAL SOLUTION | % INITIATOR | % MONOMER | IV dl/g | % CONVERSION |
| --- | --- | --- | --- | --- |
| 0.9 | 0.9 | 30 | 0.54 | 97 |
| 1.4 | 0.9 | 30 | 0.55 | 98 |
| 1.8 | 0.9 | 30 | 0.57 | 100 |
| 2.6 | 0.9 | 30 | 0.59 | 99 |
| 3.5 | 0.9 | 30 | 0.42 | 100 |
| 5.3 | 0.9 | 30 | 0.6 | 100 |

While the invention has been described in connection with specific embodiments, it should be understood that it is capable of further modification. The claims herein are intended to cover those variations which one skilled in the art would recognize as the chemical equivalent of what has been described herein.

What is claimed is:

1. A method for the free-radical (co)polymerization of vinyl trifluoroacetate monomer consisting the steps of:
   (e) preparing a mixture consisting:
      (i) vinyl trifluoroacetate monomer;
      (ii) optionally, vinyl ester monomer(s);
      (iii) a solvent selected from the group consisting of perfluorinated fluids and mixtures thereof;
      (iv) a free-radical polymerization initiator;
      (v) optionally, a water scavenger; and
   (b) activating the mixture to effect (co)polymerization of the monomers and form a (co)polymer.

2. The method of claim 1 which further comprises the step of collecting said (co)polymer.

3. The method of claim 1 wherein the solvent has a viscosity of about 0.4 to about 1000 centistokes.

4. The method of claim 1 wherein the solvent has a viscosity of about 0.4 to about 100 centistokes.

5. The method of claim 1 wherein the solvent is a perfluorinated solvent selected from the group consisting of linear aliphatic, branched aliphatic, cycloaliphatic, aromatic, aralkyl, and heterocyclic organic compounds in which all hydrogen atoms have been replaced by fluorine atoms, and which are liquids in the temperature range of from about 15° C. to about 50° C. at pressures of from about 1 to about 5 atmospheres, and mixtures thereof.

6. The method of claim 1 wherein said solvent is selected from the group consisting of perfluorinated hydrocarbons, perfluorinated amines, perfluorinated ethers, and mixtures thereof.

7. The method of claim 1 wherein the solvent is a perfluorinated solvent selected from the group consisting of perfluoro-N-methyl morpholine, perfluorohexane, and mixtures thereof.

8. The method of claim 1 wherein said solvent has a solubility parameter of equal to or less than about 6.5 $(cal/cm^3)^{1/2}$.

9. The method of claim 1 wherein the free-radical polymerization initiator is selected from the group consisting of peroxides, azo compounds, non-aqueous redox initiators, non-aqueous photoinitiators, and mixtures thereof.

10. The method of claim 1 wherein the free-radical polymerization initiator is selected from the group consisting of benzoyl peroxide, lauroyl peroxide, di(4-t-butylcyclohexyl)peroxydicarbonate, 2,2'-azobis(2-methylbutyronitrile), 2,2'-azobis(isobutyronitrile) and 2,2'-azobis(2,4-dimethylpentanenitrile).

11. The method of claim 1 wherein the free-radical polymerization initiator is di(4-t-butylcyclohexyl)peroxydicarbonate.

12. The method of claim 1 wherein the water scavenger is selected from the group consisting of anhydride(s) of carboxylic acid(s) and mixtures thereof.

13. The method of claim 1 wherein the water scavenger is selected from i the group consisting of acetic anhydride, trifluoroacetic anhydride, phthalic anhydride, succinic anhydride, and mixtures thereof.

14. The method of claim 1 wherein the water scavenger is acetic anhydride.

15. The method of claim 1 wherein said mixture consists of (i) about 1 to about 100 weight percent vinyl trifluoroacetate;

(ii) about 0 to about 99 weight percent vinyl ester; wherein the percentages of (i) and (ii) are based upon the total weight of (i) plus (ii); and wherein the mixture comprises about 5 to about 50 weight percent total monomer based upon the total weight of the mixture;

(iii) about 50 to about 95 weight percent of solvent based upon the total weight of the mixture;

(iv) about 0.1 to about 5 weight percent of a polymerization initiator based upon the total weight of monomer; and (v) about 0 to about 5 weight percent of a water scavenger based upon the total weight of the mixture.

16. The method of claim 1 wherein said mixture consists of (i) about 1 to about 100 weight percent vinyl trifluoroacetate;

(ii) about 0 to about 99 weight percent vinyl ester; wherein the percentages of (i) and (ii) are based upon the total weight of (i) plus (ii); and wherein the mixture comprises about 10 to about 35 weight percent total monomer based upon the total weight of the mixture;

(iii) about 65 to about 90 weight percent of solvent based upon the total weight of the mixture;

(iv) about 0.2 to about 2 weight percent of a polymerization initiator based upon the total weight of monomer; and (v) about 1 to about 4 weight percent of a water scavenger based upon the total weight of the mixture.

17. The method of claim 1 wherein said mixture consists of (i) about 1 to about 100 weight percent vinyl trifluoroacetate;

(ii) about 0 to about 99 weight percent vinyl ester; wherein the percentages of (i) and (ii) are based upon the total weight of (i) plus (ii); and wherein the fixture comprises about 15 to about 25 weight percent total monomer based upon the total weight of the mixture;

(iii) about 75 to about 85 weight percent of solvent based upon the total weight of the mixture (iv) about 0.3 to about 1 weight percent of a polymerization initiator based upon the total weight of monomer; and (v) about 2 to about 3 weight percent of a water scavenger based upon the total weight of the mixture.

18. The method of claim 1 wherein the mixture consists of about 80 to about 99.9 percent by weight vinyl trifluoroacetate and about 0.1 to about 20 percent by weight vinyl ester based upon the total monomer weight.

19. The method of claim 1 wherein the mixture consists of about 90 to about 99.8 percent by weight vinyl trifluoroacetate and about 0.2 to about 10 percent by weight vinyl ester based upon the total monomer weight.

20. The method of claim 1 wherein the mixture consists of about 95 to about 99.7 percent by weight vinyl trifluoroacetate and about 0.25 to about 5 percent by weight vinyl ester based upon the total monomer weight.

\* \* \* \* \*